United States Patent
Chen et al.

(10) Patent No.: US 6,764,017 B2
(45) Date of Patent: Jul. 20, 2004

(54) MULTI-FUNCTION ELECTRONIC CARD

(75) Inventors: Jui-Chung Chen, Kaohsiung Hsien (TW); Po-Jen Hsueh, Kaohsiung (TW); Sidney Young, Hsin-Chu (TW); Ping-Chang Liu, Chu Pei (TW)

(73) Assignees: C-One Technology Corp., Hsin-Chu (TW); Pretec Electronics Corp., Fremont, CA (US)

( * ) Notice: Subject to any disclaimer, the term of this patent is extended or adjusted under 35 U.S.C. 154(b) by 114 days.

(21) Appl. No.: 10/151,926

(22) Filed: May 22, 2002

(65) Prior Publication Data

US 2003/0218071 A1 Nov. 27, 2003

(51) Int. Cl.$^7$ .......................... G06F 13/26; G06K 19/06
(52) U.S. Cl. ...................................... 235/492; 710/264
(58) Field of Search .................. 235/492; 710/260–269, 710/36, 48, 49

(56) References Cited

U.S. PATENT DOCUMENTS

| | | | | |
|---|---|---|---|---|
| 5,794,014 A | * | 8/1998 | Shetty et al. ................. | 703/25 |
| 5,805,929 A | * | 9/1998 | Connolly et al. ............. | 710/49 |
| 6,006,301 A | * | 12/1999 | Tetrick ........................ | 710/260 |
| 6,081,867 A | * | 6/2000 | Cox ........................... | 710/264 |
| 6,397,284 B1 | * | 5/2002 | Sleeman et al. ............. | 710/266 |

* cited by examiner

Primary Examiner—Michael G. Lee
Assistant Examiner—Jamara A Franklin
(74) Attorney, Agent, or Firm—Bacon & Thomas, PLLC

(57) ABSTRACT

A multi-function electronic card has a host interface, a multi-functional controller and a plurality of function devices. Each function device is connected to the host via the host interface by issuing an interrupt request to the multi-functional controller. The multi-functional controller has an interrupt queue and an interrupt status register, each bit of the interrupt status register corresponding to a function device. When a function device issues an interrupt request, an identification number of the function device is stored into the interrupt queue, and only when all the bits in the interrupt status register are zeros, a corresponding bit in the interrupt status register is set as 1 for issuing an interrupt request to the host. When the host has serviced the function device, the interrupt queue is updated and the interrupt status register is cleared.

6 Claims, 6 Drawing Sheets

MULTI-FUNCTION ELECTRONIC CARD

BACKGROUND OF THE INVENTION

1. Field of the Invention

The present invention relates to an electronic card, and more particularly to a multi-function electronic card.

2. Description of Related Art

In the current computer system structure, there are many electronic cards using one interface to provide two or more than two functions. Taking the PCMCIA/CF interface as an example, such a multi-function card is known as LAN/Modem PC Card, ISDN/Modem PC card, Dual serial port PC card, etc. FIG. 1 shows a PCMCIA/CF card supporting N function devices. By a multi-functional controller 11, the N function devices 12 are connected to a host system. According to the PCMCIA/CF specification, there are N functional configuration registers (FCRs) built in the multi-functional controller 11. Thus, the multi-functional controller 11 includes N configuration state registers (CSR). Each CSR is corresponding to a function device 12 for providing the respective control and state information to the host system. For example, the CSR bit 1 (D1) is defined as an interrupt status bit. That is, when one function device 12 issues an interrupt request (IRQ), the CRS bit 1 is set as 1.

If P function devices in the N function devices issue interrupt requests to the multi-functional controller 11, conventionally, as illustrated in FIG. 2, the function device A will issue a first interrupt request IRQ and thus the CSR D1 of the function device A is set as 1. Meanwhile, other function devices also issue interrupt requests IRQs and the D1s of corresponding CSRs are also set as 1. Therefore, the Host IREQ# pin of the multifunctional controller 11 corresponding to the host bus is pulled low, so as to notify the host that there is an interrupt. Then, the interrupt service routine (ISR) checks the multi-functional controller 11 and realizes that the P D1s in the built-in CSRs is set as 1. Therefore, the ISR records the P sets of IRQ data in an interrupt entry table. Then, all D1s in the CSRs are set as zero. Subsequently, based on the contents of the interrupt entry table, the function device A is processed firstly and D1 of the CSR of the function device A is set as 1. When the process is finished, an end of interrupt (EOI) instruction is issued and D1 of the CRS of the function device A is set as zero. At this moment, all D1s in the P CSRs are also zero. Then, the ISR determines to process the second function device B according to the records in the interrupt entry table and then sets the D1 as 1 in the CSR of the function device B. When the process is finished, an EOI instruction is performed to clear the D1 of the CRS of the function device B. According to the above process, the service routine is performed until the service of the p-th function device is completed. The IRQ timing diagram is illustrated in FIG. 3.

From the above example, it is known that, in the conventional multi-function electronic card, when a lot of IRQs required processes, the host must clear and set the D1s of the CSRs of the multi-functional controller 11 very frequently, which results in a great burden to the host, and thus the host may delay the time to process the function devices and can not effectively manage and support the function devices. Therefore, there is a desire for the above conventional multi-function electronic card to be improved.

SUMMARY OF THE INVENTION

Accordingly, the primary objective of the present invention is to provide a multi-function electronic card for eliminating the problems in the conventional skill.

To achieve above mentioned objective, the multi-function electronic card in accordance with the present invention includes: a host interface for connecting to a host; a multi-functional controller; and a plurality of function devices, each function device connecting to the host via the host interface by issuing an interrupt request to the multi-functional controller. The multifunctional controller has an interrupt queue and an interrupt status register, each bit of the interrupt status register corresponding to a function device. When a function device issues an interrupt request, an identification number of the function device is stored into the interrupt queue, and only when all the bits in the interrupt status register are zeros, a corresponding bit in the interrupt status register is set as 1 for issuing an interrupt request to the host. When the host has processed the function device, the interrupt queue is updated and the interrupt status register is cleared.

The various objectives and advantages of the present invention will be more readily understood from the following detailed description when read in conjunction with the appended drawing.

DETAILED DESCRIPTION OF THE PREFERRED EMBODIMENTS

Figure 1:
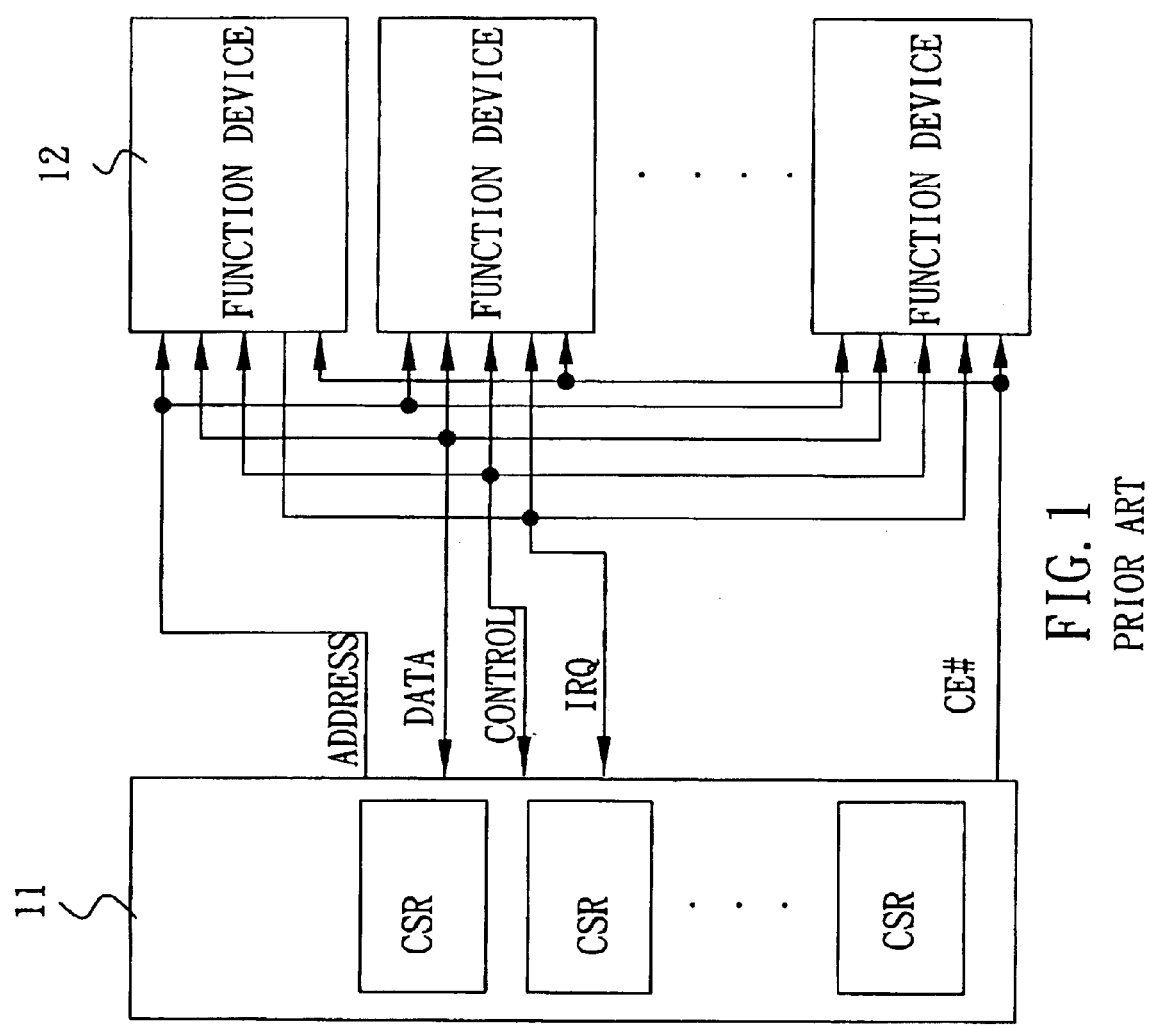
FIG. 1 shows the structure of a PCMCIA/CF card capable of supporting N function devices.
Figure 2:
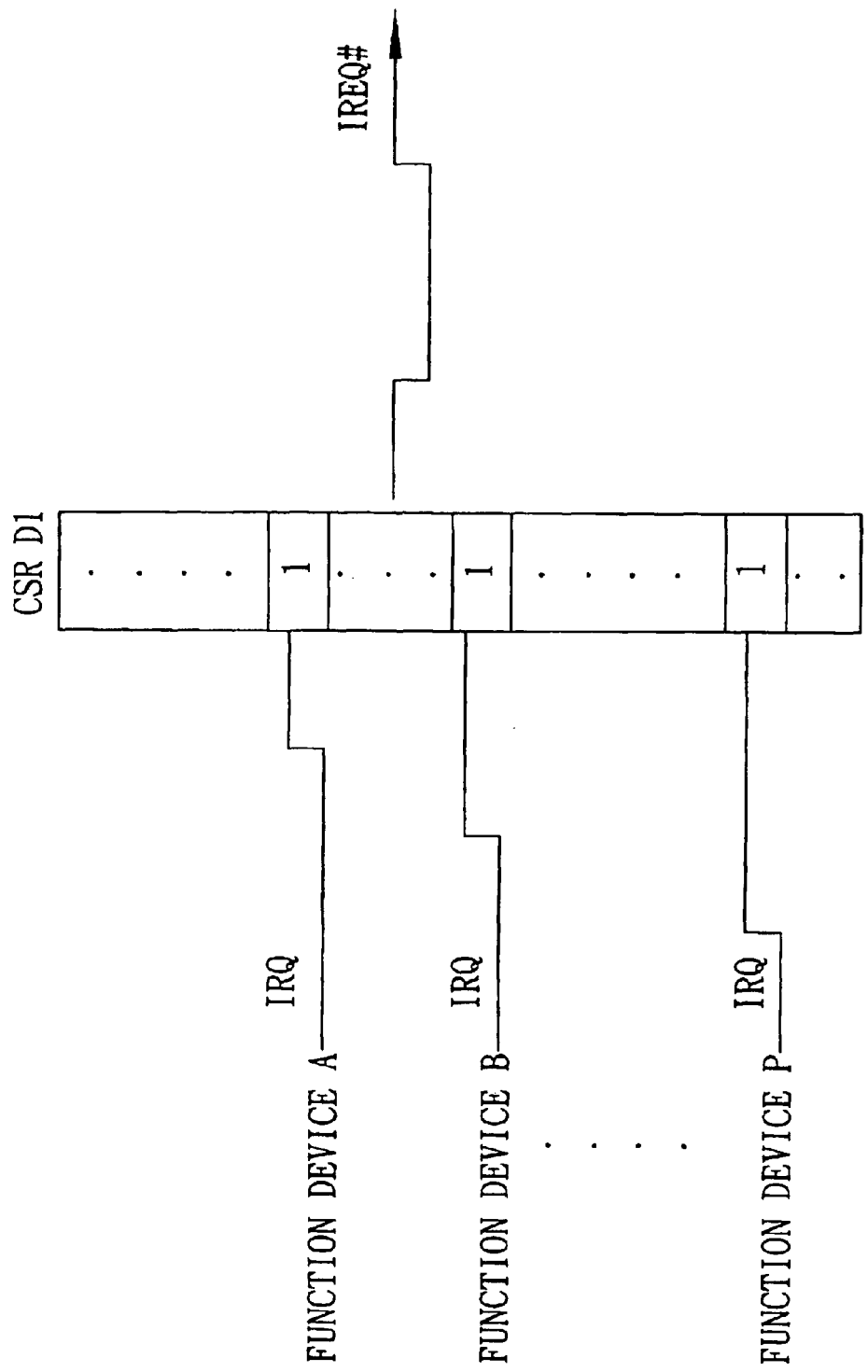
FIG. 2 is a schematic view showing that P function devices in N function devices issue interrupt requests.
Figure 3:
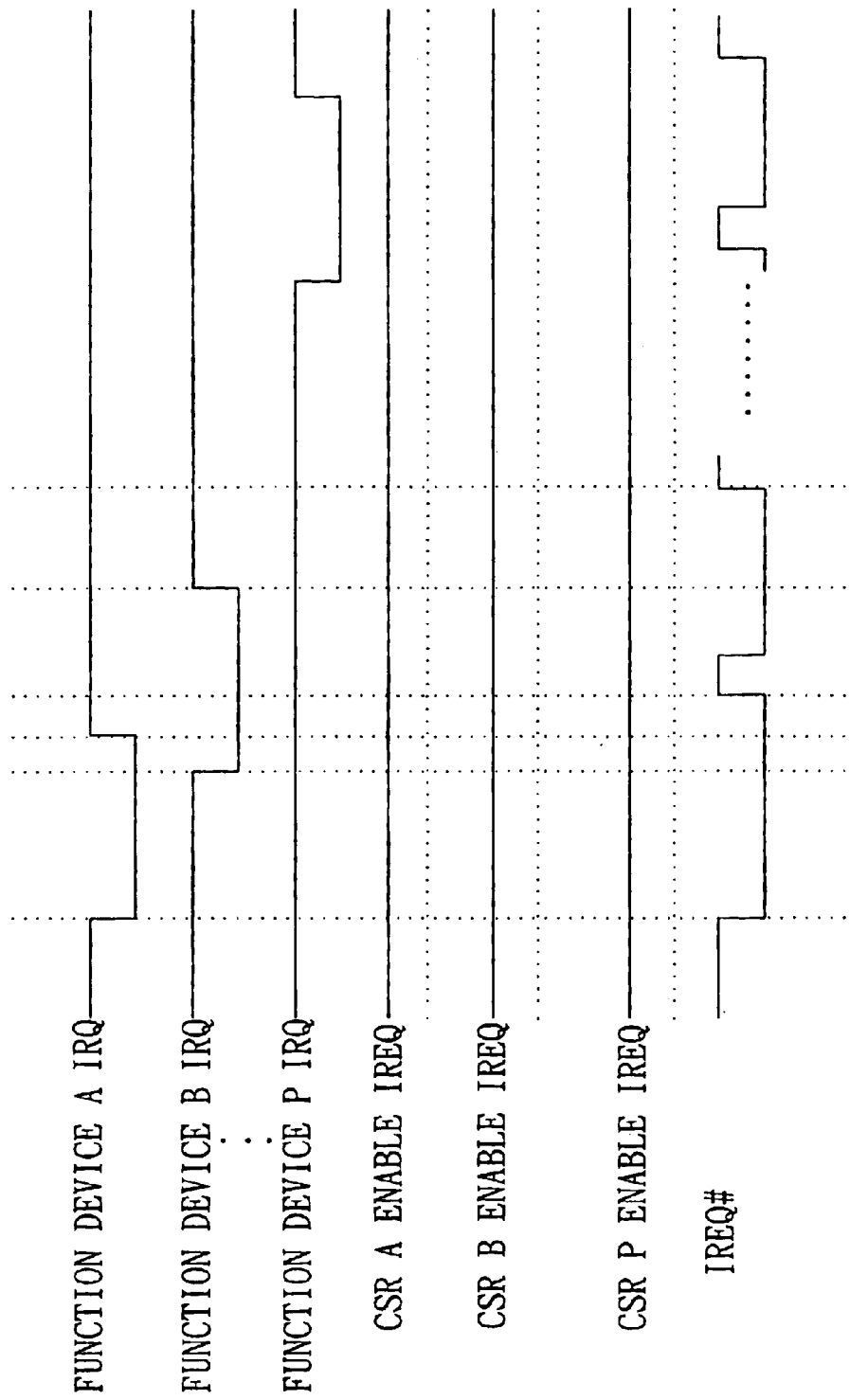
FIG. 3 shows the IRQ timing diagram of the structure shown in FIG. 1.
Figure 4:
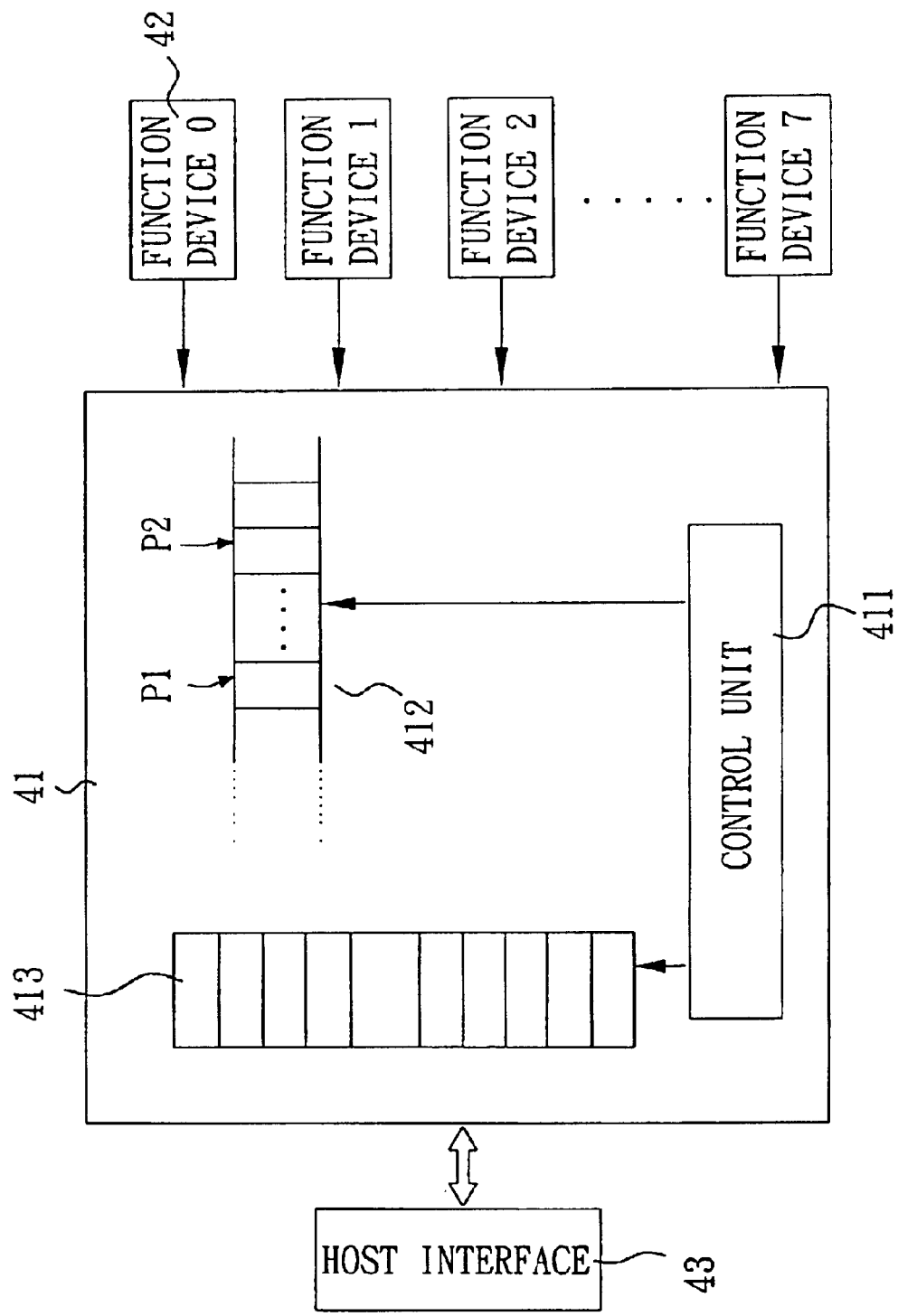
FIG. 4 shows the structure of the multi-function electronic card in accordance with the present invention.

Referring to FIG. 4, one preferred embodiment of the present invention is illustrated. The multi-function electronic card of the present invention includes a plurality of function devices 42, a multi-functional controller 41 and a host interface 43. Each function device 42 issues interrupt requests to the multi-functional controller 41, and communicates with a host system through the host interface 43. The host interface 43 is preferably a PCMCIA/CF interface.

The multi-functional controller 41 has a control unit 411, an interrupt queue 412, and an interrupt status register 413. The interrupt status register 413 has a plurality of interrupt status bits. Each interrupt status bit is corresponding to a function device 42. That is, when an interrupt status bit is set as 1, it represents that the function device 42 corresponding to the interruption status bit requires interrupt service. In this preferred embodiment, the multi-function electronic card has eight function devices 42 denoted by IDs 0 to 7. The interrupt status register 413 has eight bits. The interrupt queue 412 has a plurality of items, totally eight interrupt status bits for storing the IDs of the function devices 42 that require interrupt service in a first in first out manner. The interrupt queue 412 has a first pointer P1 and a second pointer P2 for pointing to the front and rear items of the queue, respectively. The interrupt status register 413 is, for example, the set of CSR bits 1 defined in the PCMCIA/CF specification.

Figure 5:
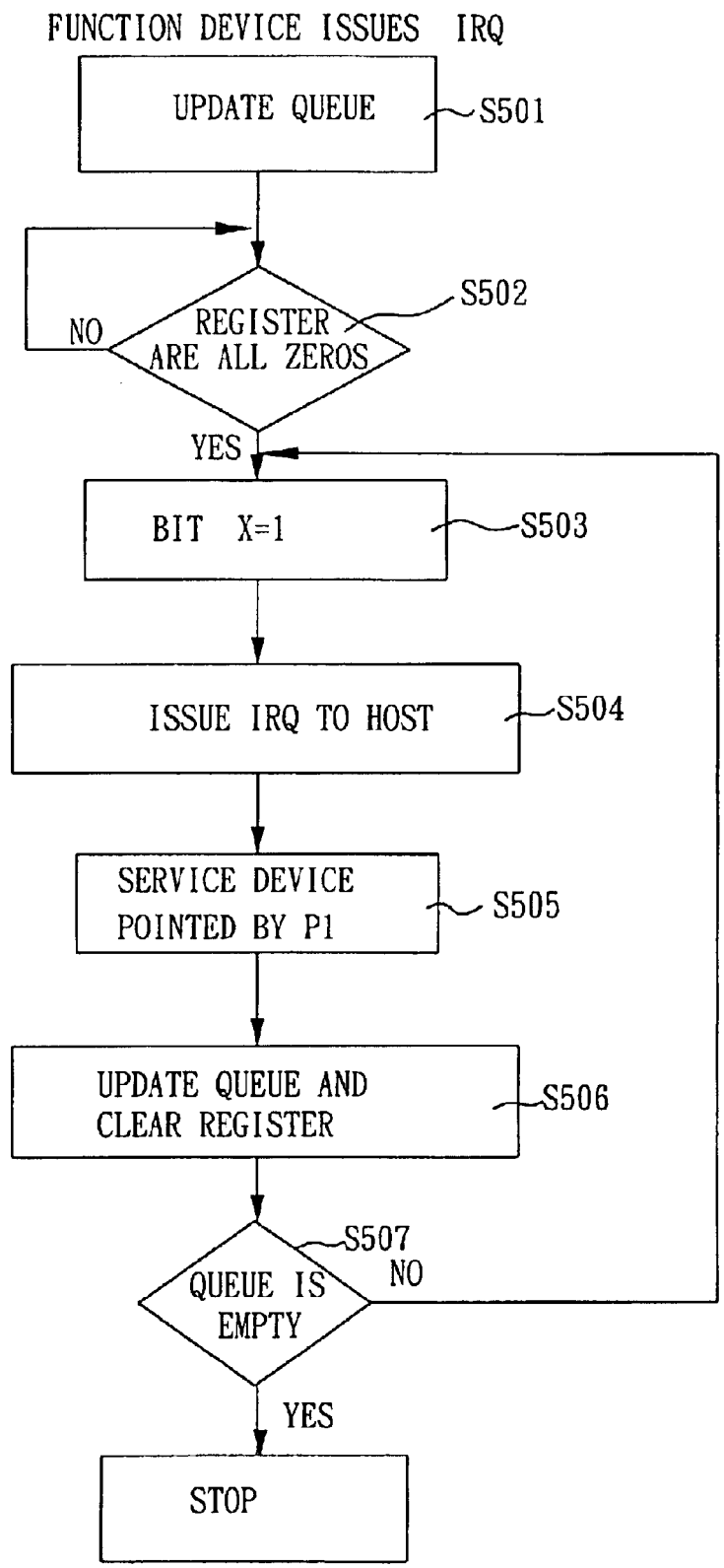
FIG. 5 shows the operational flow of the multi-function electronic card in accordance with the present invention.

The above control unit 411 distributes interrupt service according to the IRQs issued from the function devices 42. Referring to the flowchart illustrated in FIG. 5, when a function device 42 with an ID=x issues an interrupt request, the process performs the step of storing the ID=x into the interrupt queue 412 and updating the pointers P1 and P2 (step S501). Then, it is determined whether all bits in the interrupt status register 413 are zero (step S502), and if so, it represents that no function device issues interrupt requests previously and thus the x-th bit of the interrupt status register 413 is set as 1 (step S503). Accordingly, an interrupt request is issued to the host (step S504). Furthermore, if step S502 determines that some bits in the interrupt status register 413 is set as a 1, it represents that another function device has issued an interrupt request, and thus the bit of the interrupt status register 413 is not set.

When receiving the interrupt request, the host provides service to the function device with ID=x according to the content (ID=x) pointed by the pointer P1 of the interrupt queue 412 (step S505). Then, the interrupt queue 412 is updated and the interrupt status register 413 is cleared (step S506). Next, it is determined whether the interrupt queue 412 is empty (step S507), and if so, it indicates all the interrupt services for the function devices have been completed. Otherwise, the corresponding bit of the interrupt status register 413 is set as 1 according to the content pointed by the pointer P1 (step S503). The above process is repeatedly executed until the interrupt queue 412 is empty.

Figure 6:
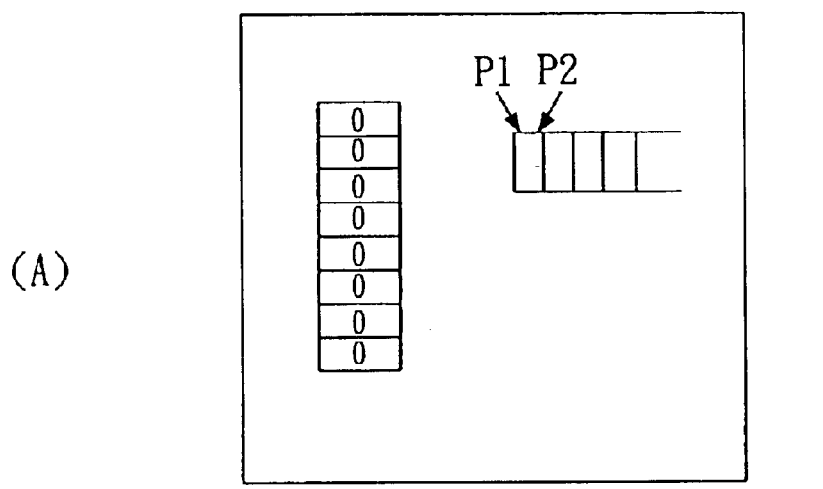
FIG. 6 shows an exemplary operation of the multi-function electronic card in accordance with the present invention.
Figure 6:
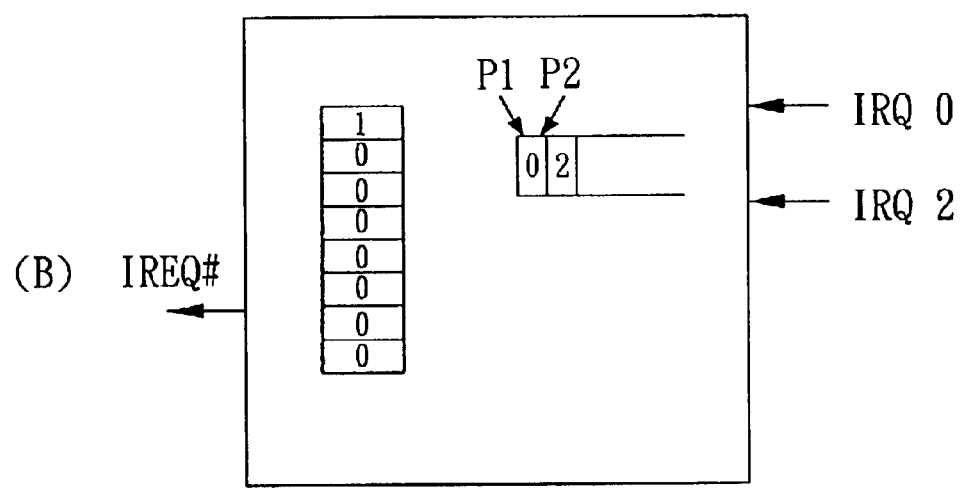
Figure 6:
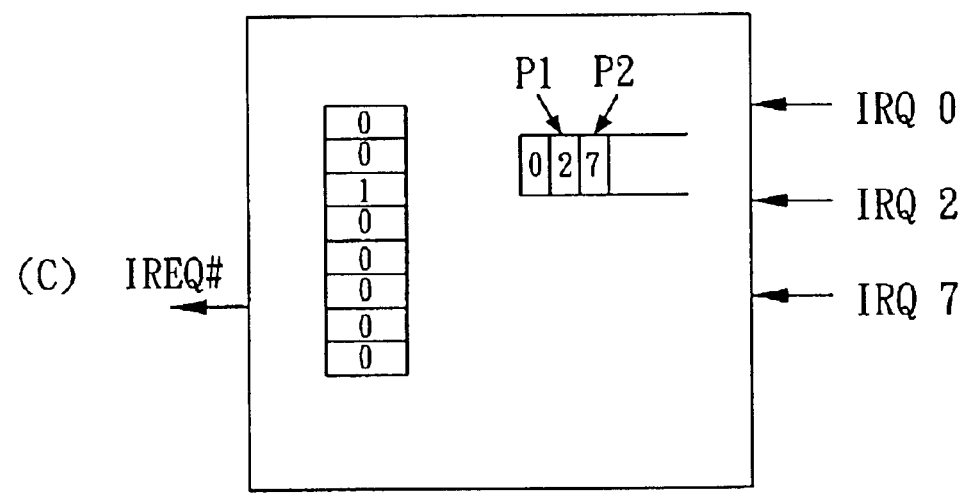

For example, when the system is initialized and no interrupt is asserted, the interrupt queue 412 is empty. All the bit values in the interrupt status register 413 are zeros, and pointers P1 and P2 point to the O-th position of the interrupt queue 412, as shown in FIG. 6(A). Then, when the function device 0 issues an interrupt request IRQ0, this IRQ0 is stored in the interrupt queue 412 and it is determined that all the bit values of the interrupt status register 413 are zeros. Therefore, the bit 0 corresponding to the function device with ID=0 is set as 1. At the same time, if the function device with ID=2 also issues an interrupt request IRQ2, this IRQ2 is stored in the 1-th position of the interrupt queue 412 and the pointer P2 points to the position, as illustrated in FIG. 6(B).

Because the bit 0 in the interrupt status register 413 is set as 1 at this moment, the bit 2 will not be set again. In addition, the IRQ0 also issues IREQ# to the host through the host bus. When the host receives the IREQ#, the interrupt service routine starts to check the multi-functional controller. If the interrupt bit D1 in the corresponding CSR is set as 1, it is known that function device 0 that issues IRQ0 is processed at first. Then, the addresses of the pointers P1 and P2 are checked to indicate there being an IRQ2 of the function device 2 queued in the interrupt queue 412 to be processed next.

If the function device 7 also issues an interrupt request IRQ7, the pointer P2 moves backwards, as illustrated in FIG. 6(C). At this moment, since the IRQ0 has been processed, the interrupt bit D1 of the corresponding CSR will automatically restore to zero, instead of being cleared by the host system. Thus, the bit 2 of the interrupt status register 413 is set as 1, and an interrupt is issued to the host. Then, the interrupt service routine checks that the interrupt bit D1 of the corresponding CSR has been set as 1, so it will start processing the function device 2 that issues the IRQ2. Afterwards, the function device 7 is also processed by the same mechanism.

In view of the foregoing, it is appreciated that the present invention makes use of an interrupt queue to store the interrupt requests from the function devices and processes the interrupt request of a function device only when all the bits in the interrupt status register are zeros, so as to set the bit of the interrupt status register corresponding to the function device as 1 for issuing an interrupt to the host. Accordingly, the host can sequentially process a plurality of interrupt requests from different function devices. The host does not require repeatedly setting and clearing the interrupt status register, and thus no extra burden is produced on the host.

The present invention is thus described; it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A multi-function electronic card comprising:
a host interface for connecting to a host;
a multi-functional controller; and
a plurality of function devices, each function device connecting to the host via the host interface by issuing an interrupt request to the multi-functional controller;
wherein the multi-functional controller has an interrupt queue and an interrupt status register, each bit of the interrupt status register corresponding to a function device; when a function device issues an interrupt request, an identification number of the function device is stored into the interrupt queue, and only when all the bits in the interrupt status register are zeros, a corresponding bit in the interrupt status register is set as 1 for issuing an interrupt request to the host; when the host has processed the function device, the interrupt queue is updated and the interrupt status register is cleared.

2. The multi-function electronic card as claimed in claim 1, wherein the interrupt status register has a plurality of bits, and when a bit is set as 1, it indicates that a function device corresponding to the bit needs an interrupt service.

3. The multi-function electronic card as claimed in claim 1, wherein the interrupt queue has a plurality of items for storing the identification numbers of the function devices to be served in a first-in/first-out manner, and the interrupt queue has a first pointer and a second pointer for pointing to a front item and rear item of the queue.

4. The multi-function electronic card as claimed in claim 3, wherein when receiving an interrupt request, the host serves a corresponding function device according to the item pointed to by the first pointer.

5. The multi-function electronic card as claimed in claim 1, wherein the host interface is a PCMCIA/CF interface.

6. The multi-function electronic card as claimed in claim 5, wherein the interrupt status register is a set of CSR bits 1 defined in the PCMCIA/CF specification.

* * * * *